Patented Jan. 11, 1938

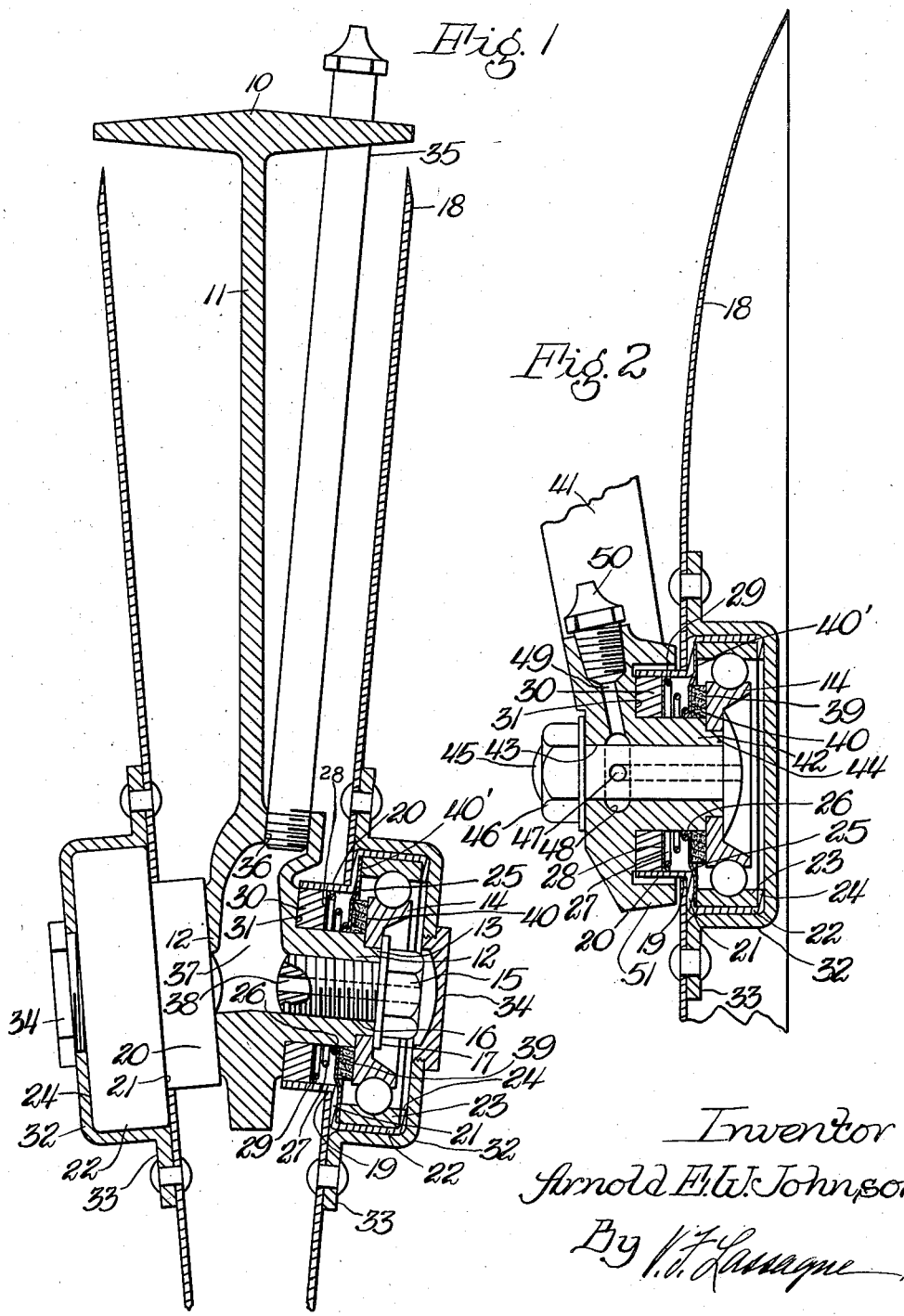

2,105,120

UNITED STATES PATENT OFFICE 2,105,120

FURROW OPENER FOR GRAIN DRILLS

Arnold E. W. Johnson, Chicago, Ill., assignor to International Harvester Company, a corporation of New Jersey Application June 8, 1936, Serial No. 84,092

7 Claims. (Cl. 308—181)

This invention relates to a furrow opener for grain drills. More particularly it relates to a ball bearing construction adapted to be used for furrow opening disks which operate in very dusty conditions.

The principal object of the invention is to provide in combination with a disk support a ball bearing assembly and a seal therefor which is effective to prevent the entrance of dirt and to retain lubricant in the bearing. Other objects relating to the details of construction will be apparent from the description to follow.

In the drawing:

Figure 1 is a vertical cross section showing a portion of a supporting structure as utilized on grain drills and a double disk furrow opener incorporating the invention; and, Figure 2 shows a modification for a single disk embodying the same bearing and seal shown in Figure 1.

In Figure 1 the portion of the supporting structure shown consists of a transverse head portion 10 and a vertical portion 11 integrally cast with the head portion 10. Integral with the vertical portion 11 two oppositely extending supports 12 are provided. The supports are cylindrical in cross section and are arranged at an angle with respect to horizontal sufficiently to provide the desired angularity of the disks mounted thereon. At the outer end of each extension 12 a reduced end portion 13 is formed to provide a shoulder against which the inner bearing race 14 is seated. Said race is formed to provide the usual contact face for ball bearings and is narrowed at its center portion to facilitate adjustment to the support 12. The race 14 is securely mounted in position by a cap-screw 15 threaded into a bore 16 formed in the support 12 coaxially thereof. A washer 17 is utilized for transmitting pressure from the cap-screw to the central portion of the race 14.

As each side of the disk and bearing construction is identical, reference will be made only to one side in the description. A disk 18 is provided with a central opening 19, through which a cylindrical sleeve 20 extends. Said sleeve is a portion of the bearing assembly as specially constructed for application in this device. The cylindrical sleeve 20 integrally joins with an annular portion 21 which fits against the disk adjacent the central opening 19. A cylindrical portion 22 integral with the annular portion 21 forms a housing for the outer bearing race 23. At its outer end the portion 22 is bent down to form an inturned flange 24 abutting the outer end of the outer bearing race. A thin sheet metal annulus 25 is formed between the inner end of the bearing race 23 and the annular portion 21 of the housing. Said annulus extends radially inwardly, being provided with a flange 26 adjacent the surface of the cylindrical support 12. A spiral spring 27 is formed with one end abutting the annulus 25 in contact with the flange 26. The large end of the spring 27 abuts an annular member 28 adjacent a flange 29 formed at the periphery thereof. Said flange is adapted to slidably engage the inner wall of the sleeve 20.

The annular member 28 engages a ring 30 of suitable material for providing a dust seal. Said ring is rectangular in cross section, abutting the sleeve 20, the support 12, the annular member 28, and a face 31 formed on the supporting structure in a plane perpendicular to the axis of the support 12. It will be noted that the sleeve 20 extends to the plane of the face 31. The sleeve 20, annular portion 21, the cylindrical portion 22, and the flange 24 form a retaining structure for the dirt and oil seal and for the bearing. This entire structure may be considered as a unit.

To retain the bearing assembly and its associated parts in position, a cup 32 of the same inside diameter as the outside diameter of the cylindrical portion 22 is attached to the disk 18 by means of a radial flange 33 secured by rivets to said disk. In order to provide for assembling the disk into position on its supporting structure, a removable plug 34 is threaded into an opening in the end wall of the cup 32. Said opening is sufficiently large for the insertion of a wrench for loosening or tightening the cap-screw 15.

For supplying lubricant to the bearing, a tube 35, extending through the head portion 10 of the supporting structure, is threaded into an opening 36 cored in the bottom of the supporting structure above the support 12 and above the face 31 formed around said support. A lubricant passage 37 extends from the opening 36 to the threaded bores 16 into which the cap-screws 15 are threaded. Said cap-screw is formed with a conduit 38 extending from end to end to provide a lubricant passage from the passage 37 to the cup 32 whereby oil or other suitable lubricant may be supplied to the bearing. To prevent the escape of oil from the bearing, a ring 39 of suitable resilient material, such as felt or oil resisting composition, is fitted between a face 40 formed on the inner race 14 perpendicular to the main axis of the bearing and the inner surface of the annulus 25. It will be noted that said annulus is provided with a circumferential bent portion 40' which permits the use of a wider ring of sealing material and which also helps to retain the ring in concentric position around the support 12.

By means of this construction a seal is obtained on a radial face. Heretofore seals of this type have not been provided in structures of the general type herein disclosed. A face contact of this type maintains a large sealing area even with a considerable eccentricity or wabble in the bearing due to wear or other causes. The spring 27 acts simultaneously to resiliently hold the thin annulus 25 against the sealing ring 30 at its center and to press the ring 31 at its periphery into contact with the sleeve 20. By such a construction, a very effective and durable seal has been obtained for preventing the entrance of dust and dirt and for retaining lubricant in the bearing.

It will be noted that the lubricant supply is independent of each of the disks shown in Figure 1. In Figure 2 the same bearing assembly and retainer has been shown. The corresponding parts are numbered the same as in Figure 1. As the supporting structure and the disk construction is somewhat different, it will be described with additional reference characters.

The supporting structure 41 is provided with a cylindrical support 42 formed with an axial bore 43. The inner race 14 of the bearing assembly is held in position on a reduced end portion 44 of the support 42 by a head bolt 45, the nut 46 being threaded on the end of the bolt, which extends entirely through the supporting structure. A lubricant conduit 47 is bored through the bolt to an annular recess 48 formed around the bolt intermediate its ends in the lower end of the supporting structure. A lubricant conduit 49 connects said recess with a lubricant supply nipple 50. As there is no necessity for removing a cap-screw from inside the cup 32, as in the double disk type, a removable plug is not provided as in the first described construction. It will also be noted in the modification shown in Figure 2 that a flange 51 extends over the sleeve 20 to reduce the amount of dirt which falls on the open end of the sleeve.

The operation of the improved bearing construction and oil seal for furrow openers has been explained in connection with the description of the elements. It is to be understood that applicant has shown only certain preferred embodiments of his improved construction and that he claims as his invention all modifications falling within the scope of the appended claims.

What is claimed is:

1. A bearing construction comprising, in combination with a cylindrical support, a ball bearing race rigidly secured to the outer end of said support, an outer bearing race and a plurality of balls adapted to radial and axial loads mounted on said race, a retaining structure comprising a sleeve concentric with respect to the cylindrical support and a portion secured to the outer race, a flexible sealing annulus secured to the outer bearing race, a sealing member of resilient material contacting one face of said annulus and one face of the inner bearing race, and an annular sealing member abutting the outer surface of the cylindrical support and the inner surface of the sleeve.

2. A bearing construction comprising, in combination with a cylindrical support, a ball bearing race rigidly secured to the outer end of said support, an outer bearing race and a plurality of balls adapted to radial and axial loads mounted on said race, a retaining structure comprising a sleeve concentric with respect to the cylindrical support and a portion secured to the outer race, a flexible sealing annulus secured to the outer bearing race, a sealing member of resilient material contacting one face of said annulus and one face of the inner bearing race, an annular sealing member abutting the outer surface of the cylindrical support and the inner surface of the sleeve, and a spring abutting said sealing member and the sealing annulus.

3. A bearing construction for furrow openers comprising, in combination with a supporting structure and a cylindrical support extending therefrom, a ball bearing race rigidly secured to the outer end of said support, an outer bearing race and a plurality of balls adapted to radial and axial loads mounted on said race, a retaining structure comprising a sleeve concentric with respect to the cylindrical support and a portion extending around the outer race and permanently secured in position with respect thereto, a flexible sealing annulus secured between the outer bearing race and a portion of said retaining structure, a sealing member of resilient material contacting one face of said annulus and one face of the inner bearing race, an annular sealing member abutting the outer surface of the cylindrical support and the inner surface of the sleeve, a ground engaging apertured disk fitted over said sleeve and abutting a portion of the retaining structure, and a flanged cup enclosing the retaining structure and being rigidly secured to the disk.

4. A bearing construction for furrow openers comprising, in combination with a supporting structure and a cylindrical support extending therefrom, a ball bearing race rigidly secured to the other end of said support, an outer bearing race and a plurality of balls adapted to radial and axial loads mounted on said race, a retaining structure comprising a sleeve concentric with respect to the cylindrical support and a portion secured to the outer race, a flexible sealing annulus secured between the outer bearing race and a portion of said retaining structure, a sealing member of resilient material contacting one face of said annulus and one face of the inner bearing race, a spring mounted in the annular space between the sleeve and cylindrical support, an annular sealing member abutting said face, the outer surface of the cylindrical support and the inner surface of the sleeve, said spring abutting said annular sealing member, a ground engaging disk fitted over said sleeve and abutting a portion of the retainer, and a flanged cup enclosing the retaining structure and being rigidly secured to the disk.

5. A bearing construction for furrow openers comprising, in combination with a supporting structure and a cylindrical support extending therefrom, a ball bearing race rigidly secured to the outer end of said support, an outer bearing race and a plurality of balls adapted to radial and axial loads mounted on said race, a retaining structure comprising a sleeve concentric with respect to the cylindrical support and a portion extending around the outer race and permanently secured in position with respect thereto, a flexible sealing annulus secured between the outer bearing race and a portion of said retaining structure, a spring mounted in the annular space between the sleeve and cylindrical support, said supporting structure being formed with a sealing surface in a plane perpendicular to the axis of the cylindrical support, an annular sealing member abutting said face, the outer surface of the cylindrical support and the inner surface of the sleeve, said spring abutting said retaining member, a ground engaging disk fitted over said sleeve and abutting a portion of the retainer, and a flange cup enclosing the retaining structure and being rigidly secured to the disk.

6. A bearing construction for furrow openers comprising, in combination with a supporting structure and a cylindrical support extending therefrom, a ball bearing race secured to the outer end of said support, an outer bearing race and a plurality of balls adapted to radial and axial loads mounted on said race, a retaining structure comprising a sleeve concentric with respect to the cylindrical support and a portion secured to the outer race, a sealing annulus secured between the outer bearing race and a portion of said retaining structure, a resilient sealing member contacting one face of said annulus and one face of the inner bearing race, a spring mounted in the annular space between the sleeve and cylindrical support, said spring being spiral with its end of smallest diameter abutting the annulus adjacent the cylindrical support, said supporting structure being formed with a sealing surface, an annular sealing member abutting said face, the outer surface of the cylindrical support and the inner surface of the sleeve, said spiral spring having its end of largest diameter abutting said sealing member adjacent the sleeve, a ground engaging disk fitted over said sleeve and abutting a portion of the retainer, and a flanged cup enclosing the retaining structure and being rigidly secured to the disk.

7. A bearing construction for furrow openers comprising, in combination with a supporting structure and a cylindrical support extending therefrom, a ball bearing race rigidly secured to the outer end of said support, an outer bearing race and a plurality of balls adapted to radial and axial loads mounted on said race, a retaining structure comprising a sleeve concentric with respect to the cylindrical support and a portion extending around the outer race and permanently secured in position with respect thereto, an annular sealing member abutting the outer surface of the cylindrical support and the inner surface of the sleeve, a ground engaging apertured disk fitted over said sleeve and abutting a portion of the retaining structure, and a flanged cup enclosing the retaining structure and being rigidly secured to the disk.

ARNOLD E. W. JOHNSON.